(12) United States Patent
Seo et al.

(10) Patent No.: US 7,980,985 B2
(45) Date of Patent: Jul. 19, 2011

(54) GEAR TRAIN OF AUTOMATIC TRANSMISSION FOR VEHICLE

(75) Inventors: Kang Soo Seo, Suwon (KR); Hyu Tae Shim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 433 days.

(21) Appl. No.: 12/269,377

(22) Filed: Nov. 12, 2008

(65) Prior Publication Data

US 2009/0247351 A1 Oct. 1, 2009

(30) Foreign Application Priority Data

Apr. 1, 2008 (KR) .................. 10-2008-0030498

(51) Int. Cl.
*F16H 3/62* (2006.01)
(52) U.S. Cl. ........ 475/275; 475/277; 475/330; 475/288; 475/282
(58) Field of Classification Search .................. 475/275, 475/277, 282, 288, 296, 269, 330, 314
See application file for complete search history.

(56) References Cited

U.S. PATENT DOCUMENTS

| 7,614,975 | B2 * | 11/2009 | Seo | 475/278 |
| 7,878,934 | B2 * | 2/2011 | Lee | 475/128 |
| 2008/0103015 | A1 * | 5/2008 | Seo | 475/280 |
| 2009/0247351 | A1 * | 10/2009 | Seo et al. | 475/275 |
| 2009/0280947 | A1 * | 11/2009 | Seo et al. | 475/276 |

* cited by examiner

*Primary Examiner* — J. Allen Shriver, II
*Assistant Examiner* — Lillian Nguyen
(74) *Attorney, Agent, or Firm* — Morgan, Lewis & Bockius LLP (57) ABSTRACT

A gear train of an automatic transmission for a vehicle may include four planetary gear sets with three clutches and two brakes and realizes eight forward speeds, and the gear train of an automatic transmission for a vehicle may minimize the number of friction elements, simplify the scheme of an transmission, and enhance transmitting power efficiency and fuel efficiency. The four planetary gear sets may include a first planetary gear set including a first sun gear, a first planet carrier, and a first ring gear, a second planetary gear set including a second sun gear, a second planet carrier, and a second ring gear, a third planetary gear set including a third sun gear, a third planet carrier, and a third ring gear, and a fourth planetary gear set including a fourth sun gear, a fourth planet carrier, and a fourth ring gear.

6 Claims, 11 Drawing Sheets

|  | C1 | C2 | C3 | B1 | B2 | Speed ratio |
|---|---|---|---|---|---|---|
| D1 |  |  | ● | ● | ● | 4.700 |
| D2 |  | ● |  | ● | ● | 3.133 |
| D3 |  | ● | ● | ● |  | 1.600 |
| D4 | ● | ● |  | ● |  | 1.303 |
| D5 | ● |  | ● | ● |  | 1.135 |
| D6 | ● | ● | ● |  |  | 1.000 |
| D7 | ● |  | ● |  | ● | 0.839 |
| D8 | ● | ● |  |  | ● | 0.667 |
| Rev | ● |  |  | ● | ● | -3.280 |

GEAR TRAIN OF AUTOMATIC TRANSMISSION FOR VEHICLE

CROSS-REFERENCE TO RELATED APPLICATION

The present application claims priority to Korean Patent Application No. 10-2008-0030498 filed Apr. 1, 2008, the entire contents of which application is incorporated herein for all purposes by this reference.

BACKGROUND OF THE INVENTION

1. Field of the Invention

The present invention relates to a gear train of an automatic transmission for a vehicle. More particularly, the present invention relates to an automatic transmission for a vehicle that is composed of four planetary gear sets with three clutches and two brakes, and realizes eight forward speeds.

2. Description of Related Art

A typical shift mechanism of an automatic transmission utilizes a combination of a plurality of planetary gear sets. A gear train of such an automatic transmission that includes the plurality of planetary gear sets changes rotating speed and torque received from a torque converter of the automatic transmission, and accordingly changes and transmits the changed torque to an output shaft.

It is well known that when a transmission realizes a greater number of shift speeds, speed ratios of the transmission can be more optimally designed and therefore a vehicle can have better fuel mileage and better performance. For that reason, an automatic transmission that enables more shift speeds is under constant investigation.

In addition, with the same number of speeds, features of a gear train such as durability, efficiency in power transmission, and size depend a lot on the layout of combined planetary gear sets. Therefore, designs for a combining structure of a gear train are also under constant investigation.

For a manual transmission, too many speeds cause a driver the inconvenience of excessive manual shifting. However, for an automatic transmission, a transmission control unit automatically executes shifting by controlling the operation of the gear train, and therefore more speeds usually implies more merits.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a gear train of an automatic transmission for a vehicle that is composed of four planetary gear sets with three clutches and two brakes, and realizes eight forward speeds.

One aspect of the present invention is directed to a gear train of an automatic transmission for a vehicle that may include a first planetary gear set including a first sun gear, a first planet carrier, and a first ring gear, a second planetary gear set including a second sun gear, a second planet carrier, and a second ring gear, a third planetary gear set including a third sun gear, a third planet carrier, and a third ring gear, and/or a fourth planetary gear set including a fourth sun gear, a fourth planet carrier, and a fourth ring gear, first, second, and third clutches and first and second brakes, wherein an input shaft is directly connected with the second planet carrier, the second sun gear is directly connected with the first ring gear, the first planet carrier is directly connected with the third ring gear, the second ring gear is directly connected with the fourth sun gear, the third sun gear is directly connected with the fourth ring gear, the third planet carrier is variably connected with the fourth planet carrier, the fourth sun gear is variably connected with the fourth planet carrier, the second planet carrier is variably connected with the third sun gear, the first sun gear and the first ring gear are variably connected with a transmission housing, respectively, and/or the third planet carrier is connected with an output gear.

The input shaft and the second planet carrier may be connected by a first power transmitting member, the second sun gear and the first ring gear may be connected by a second power transmitting member, the first planet carrier and the third ring gear may be connected by a third power transmitting member, the second ring gear and the fourth sun gear may be connected by a fourth power transmitting member, the third sun gear and the fourth ring gear may be connected by a fifth power transmitting member, the third planet carrier and the fourth planet carrier may be variably connected by a first variable power transmitting member including the first clutch, the fourth sun gear and the fourth planet carrier may be variably connected by a second variable power transmitting member including the second clutch, the second planet carrier and the third sun gear may be variably connected by a third variable power transmitting member including the third clutch, the first sun gear may be variably connected with the transmission housing via the first brake, and/or the first ring gear may be variably connected with the transmission housing via the second brake.

The first planetary gear set may be a double pinion planetary gear set, and the second, third, and fourth planetary gear sets may be single pinion planetary gear sets.

The first, second, third, and fourth planetary gear sets may be disposed on the same shaft axis line, and may be disposed in a sequence of the first, second, third, and fourth planetary gear sets.

The first and second brakes may be disposed in front of the first planetary gear set, the third clutch may be disposed between the second and third planetary gear sets, and/or the first and second clutches may be disposed behind the fourth planetary gear set.

In another aspect of the present invention, a gear train of an automatic transmission for a vehicle, may include a first planetary gear set including a first sun gear, a first planet carrier, and a first ring gear, a second planetary gear set including a second sun gear, a second planet carrier, and a second ring gear, a third planetary gear set including a third sun gear, a third planet carrier, and a third ring gear, a fourth planetary gear set including a fourth sun gear, a fourth planet carrier, and a fourth ring gear, and/or first, second, and third clutches and first and second brakes, wherein an input shaft is directly connected with the second planet carrier via a first power transmitting member, the second sun gear is directly connected with the first ring gear via a second power transmitting member, the first planet carrier is directly connected with the third ring gear via a the third power transmitting member, the second ring gear is directly connected with the fourth sun gear via a fourth power transmitting member, the third sun gear is directly connected with the fourth ring gear via a fifth power transmitting member, the third planet carrier is variably connected with the fourth planet carrier via a first variable power transmitting member including the first clutch, the fourth sun gear is variably connected with the fourth planet carrier via a second variable power transmitting member including the second clutch, the second planet carrier is variably connected with the third sun gear via a third variable power transmitting member including the third clutch, the first sun gear is variably connected with a transmission housing via the first brake, the first ring gear is variably connected with a transmission housing via the second brake, and/or the third planet carrier is connected with an output gear.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
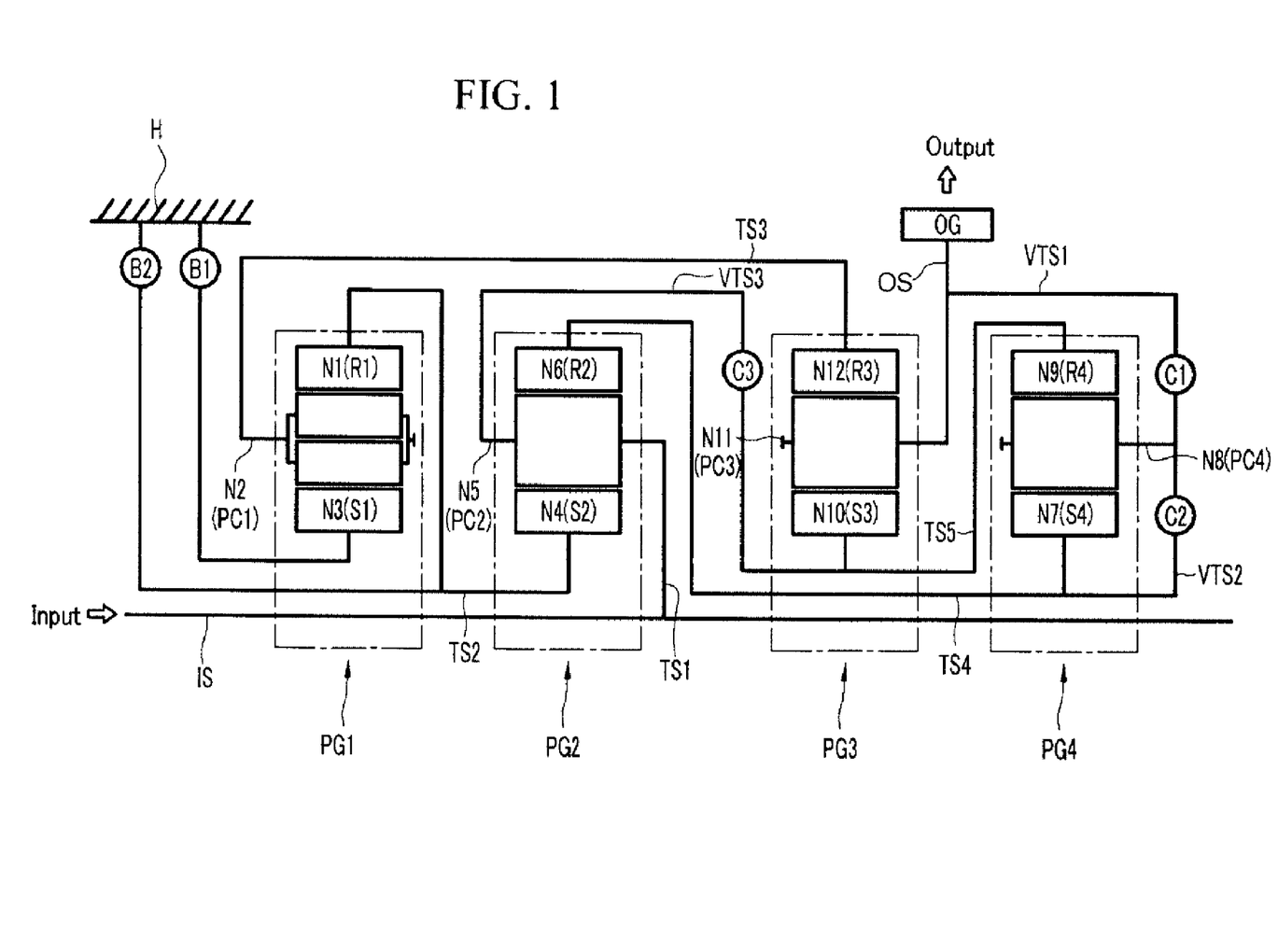
FIG. 1 is a schematic diagram of an exemplary gear train according to the present invention.

FIG. 1 is a schematic diagram of a gear train according to an exemplary embodiment of the present invention. The gear train according to an exemplary embodiment of the present invention includes first, second, third, and fourth planetary gear set PG1, PG2, PG3, and PG4 that are disposed on the same shaft axis line, three clutches C1, C2, and C3, and two brakes B1 and B2.

The first, second, third, and fourth planetary gear set are disposed on an input shaft IS in a sequence of the first, second, third, and fourth planetary gear sets PG1, PG2, PG3, and PG4.

The input shaft IS is an input member and indicates a turbine shaft in a torque converter. The input shaft IS receives a converted engine torque from the torque converter and an output shaft OS, which is an output member, and outputs a drive torque to vehicle wheels through an output gear and a differential.

The first planetary gear set PG1 is a double pinion planetary gear set, and the second, third, and fourth planetary gear set PG2, PG3, and PG4 are single pinion planetary gear sets.

The first planetary gear set PG1 includes a first sun gear S1, a first planet carrier PC1, and a first ring gear R1.

The second planetary gear set PG2 includes three operational elements, which are a second sun gear S2, a second planet carrier PC2, and a second ring gear R2.

The third planetary gear set PG3 includes three operational elements, which are a third sun gear S3, a third planet carrier PC3, and a third ring gear R3.

The fourth planetary gear set PG4 includes three operational elements, which are a fourth sun gear S4, a fourth planet carrier PC4, and a fourth ring gear R4.

Operational elements of the first, second, third, and fourth simple planetary gear set PG1, PG2, PG3, and PG4 are directly connected by five power transmitting member (TS1-TS5) and variably connected by three variable power transmitting member (VTS1-VTS3) including three clutches C1, C2, and C3.

The first power transmitting member TS1 connects the input shaft IS with the second planet carrier PC2, so that the second planet carrier PC2 operates as an input element.

The second power transmitting member TS2 connects the first ring gear R1 with the second sun gear S2, and the third power transmitting member TS3 connects the first planetary carrier PC1 with the third ring gear R3. The fourth power transmitting member TS4 connects the second ring gear R2 with the fourth sun gear S4, and the fifth power transmitting member TS5 connects the third sun gear S3 with the fourth ring gear R4.

The first variable power transmitting member VTS1 including the first clutch C1 is connected with the output gear OG and variably connects the third planet carrier PC3 operating as an output element with the fourth planet carrier PC4.

The second variable power transmitting member VTS2 including the second clutch C2 variably connects the fourth sun gear S4 with the fourth planet carrier PC4.

The third variable power transmitting member VTS3 including the third clutch C3 variably connects the second planet carrier PC2 with the third sun gear S3.

The first brake B1 variably connects the first sun gear S1 to the transmission housing H so that the first sun gear S1 selectively stops.

The second brake B2 variably connects the second power transmitting member TS2 connecting the first ring gear R1 and the second sun gear S2 to the transmission housing H so that the power transmitting member TS2 selectively stops.

The first, second, and third clutches C1, C2, and C3 and the first and second brakes B1 and B2 can be enabled as multiplate hydraulic pressure friction devices that are frictionally engaged by hydraulic pressure.

The first and second brakes B1 and B2 are arranged in front of the first planetary gear set PG1, the third clutch C3 is arranged between the second and third planetary gear sets PG2 and PG3, and the first and second clutches C1 and C2 are arranged behind the fourth planetary gear set PG4.

As described above, the friction members are dispersed so that hydraulic lines for supplying hydraulic pressure to the friction members can be easily formed and also weight can be uniformly distributed so that balance of total weight can be enhanced.

Figure 2:
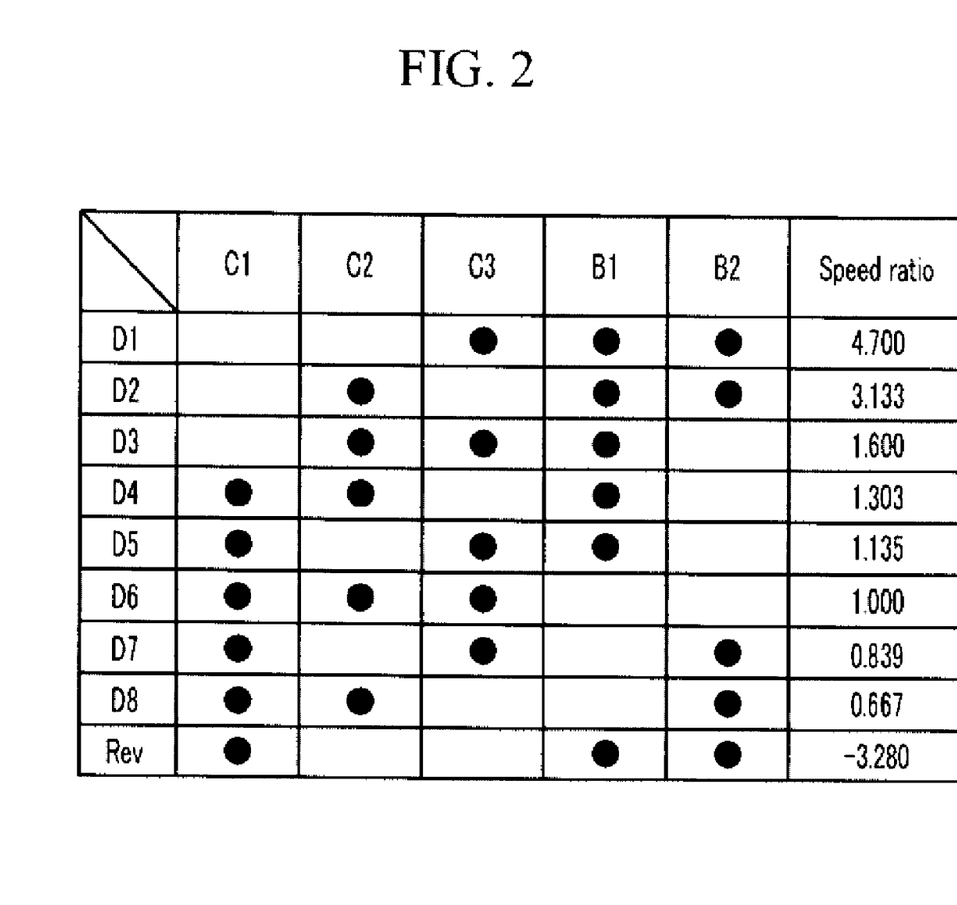
FIG. 2 is an operational chart of frictional members employed in an exemplary gear train according to the present invention.

FIG. 2 is an operational chart of frictional members employed in a gear train according to an exemplary embodiment of the present invention. In FIG. 2, the mark "●" indicates operational state of the frictional elements.

The third clutch C3 and the first and second brakes B1 and B2 are operated in the first forward speed, the second clutch C2 and the first and second brakes B1 and B2 are operated in the second forward speed, and the second and third clutches C2 and C3 and the first brake B1 are operated in the third forward speed.

The first and second clutches C1 and C2 and the first brake B1 are operated in the fourth forward speed, the first and third clutches C1 and C3 and the first brake B1 are operated in the fifth forward speed, and the first, second, and third clutches C1, C2, and C3 are operated in the sixth forward speed.

The first and third clutches C1 and C3 and the second brake B2 are operated in the seventh forward speed, the first and second clutches C1 and C2 and the second brake B2 are operated in the eighth forward speed, and the first clutch C1 and the first and second brakes B1 and B2 are operated in reverse speed.

FIG. 3 to FIG. 11 are lever diagrams of a gear train according to the exemplary embodiment of the present invention. In FIG. 3 to FIG. 11, a lower horizontal line represents "0" rotational speed, and an upper horizontal line represents "1.0" rotational speed that is the same as the rotational speed of the input shaft IS.

Three vertical lines of the first planetary gear set PG1 respectively represent the first rotational member N1 (the first ring gear R1), the second rotational member N2 (the first planet carrier PC1), and the third rotational member N3 (the first sun gear S1) sequentially from the left in the drawing, and a distance between them is determined according to a gear ratio (teeth number of sun gear/teeth number of ring gear) of the first planetary gear set PG1.

Three vertical lines of the second planetary gear set PG2 respectively represent the fourth rotational member N4 (the second sun gear S2), the fifth rotational member N5 (the second planet carrier PC2), and the sixth rotational member N6 (the second ring gear R2) sequentially from the left in the drawing, and a distance between them is determined according to a gear ratio (teeth number of sun gear/teeth number of ring gear) of the second planetary gear set PG2.

Three vertical lines of the fourth planetary gear set PG4 respectively represent the seventh rotational member N7 (the fourth sun gear S4), the eighth rotational member N8 (the fourth planet carrier PC4), and the ninth rotational member N9 (the fourth ring gear R4) sequentially from the left in the drawing, and a distance between them is determined according to a gear ratio (teeth number of sun gear/teeth number of ring gear) of the second planetary gear set PG4.

Three vertical lines of the third planetary gear set PG3 respectively represent the tenth rotational member N10 (the third sun gear S3), the eleventh rotational member N11 (the third planet carrier PC3), and the twelfth rotational member N12 (the third ring gear R3) sequentially from the left in the drawing, and a distance between them is determined according to a gear ratio (teeth number of sun gear/teeth number of ring gear) of the second planetary gear set PG3.

Determining position of the rotational elements is obvious to a person skilled in the art so a detailed explanation will be omitted.

First Forward Speed

In the first forward speed, as shown in FIG. 2, the third clutch C3 and the first and second brakes B1 and B2 are operated.

Figure 3:
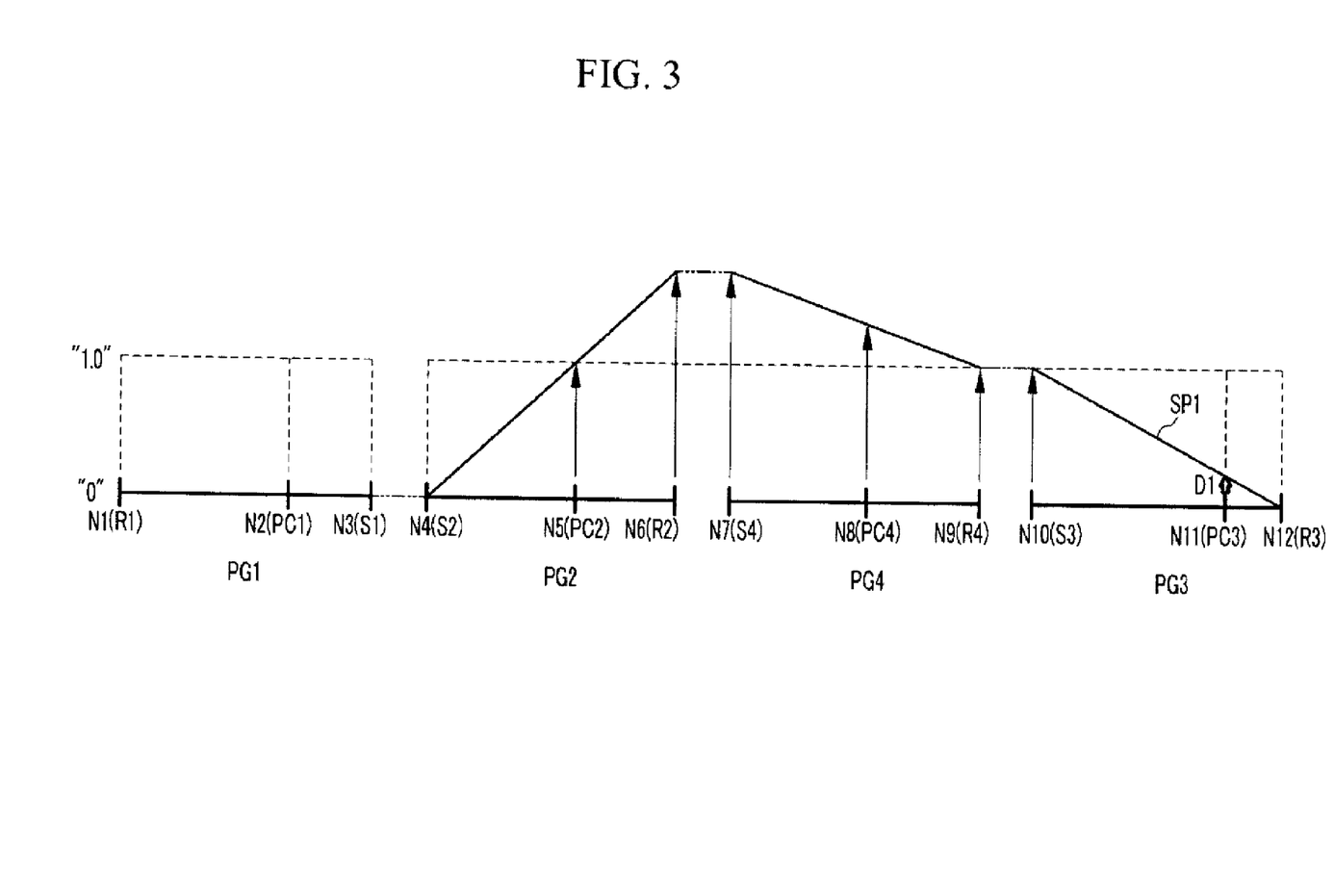
FIG. 3 is a speed diagram of an exemplary gear train according to the present invention in the first forward speed.

As shown in FIG. 3, input is performed through the fifth rotational member N5 (the second planet carrier PC2), the first planetary gear set PG1 is fixed by operations of the first and second brakes B1 and B2, and the fourth rotational member N4 (the second sun gear S2) directly connected with the first rotational member N1 (the first ring gear R1) is operated as a fixed element.

Thus, the sixth rotational member N6 (the second ring gear R2) outputs an increased speed, and the rotational speed of the fifth rotational member N5 is transmitted to the ninth rotational member N9 (the fourth ring gear R4) and the tenth rotational member N10 (the third sun gear S3) by an operation of the third clutch C3. The rotational speed of the sixth rotational member N6 is transmitted to the seventh rotational member N7 (the fourth sun gear S4).

The twelfth rotational member N12 (the third ring gear R3) is operated as a fixed element, and a first forward speed line SP1 connecting the tenth rotational member N10 as an input element and the twelfth rotational member N12 is formed. Thus, the final output speed of the gear train becomes a height D1 of the first forward speed line SP1 at the position of the eleventh operational element N11, and thus the first forward speed is realized. Herein, a speed ratio (rotation speed of an input member/rotation speed of an output member) as a maximum speed ratio of about 4.700 is realized.

Second Forward Speed

In the second forward speed, the third clutch C3 that is operated in the first forward speed is released and the second clutch C2 is operated as shown in FIG. 2.

Figure 4:
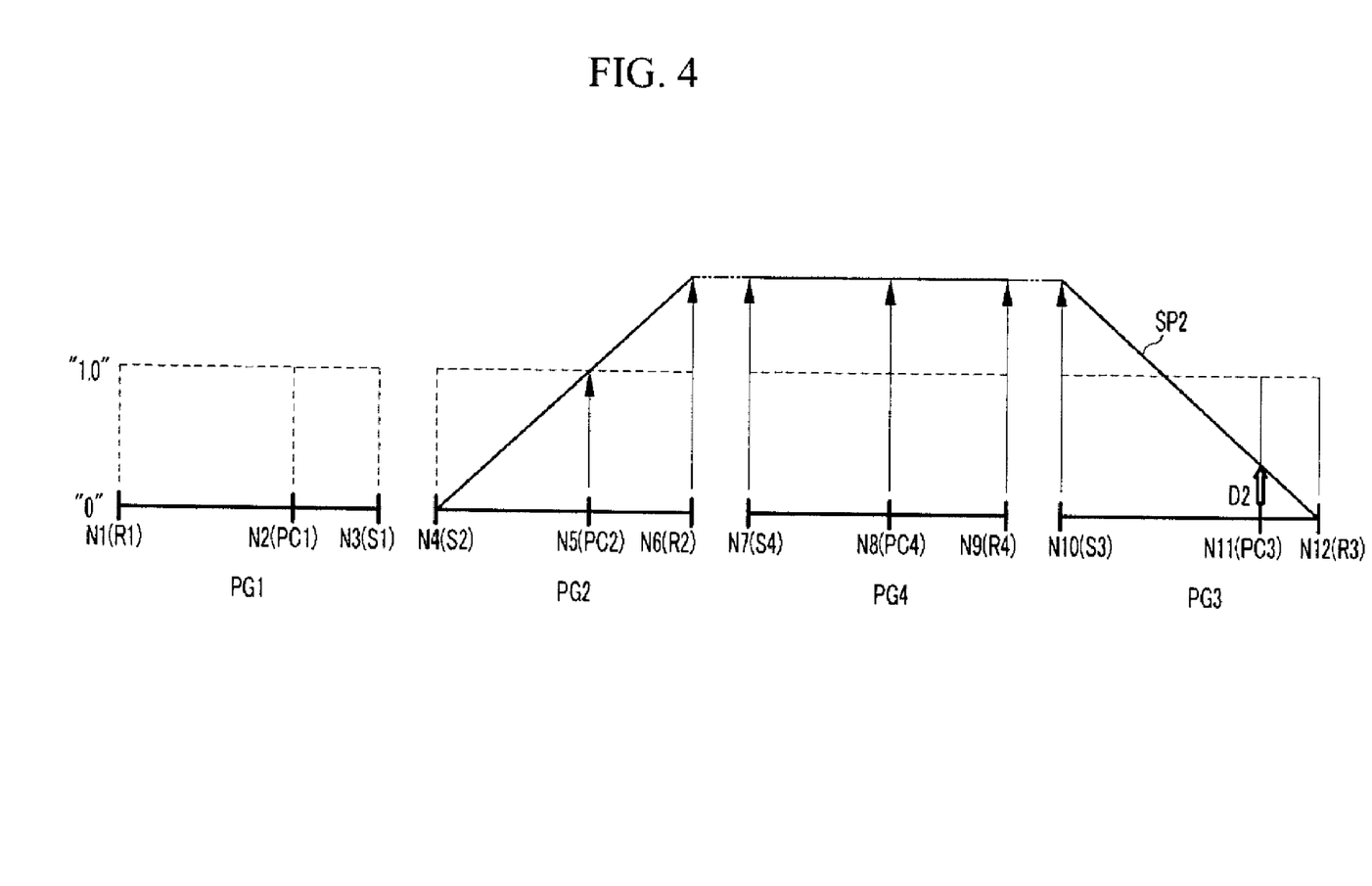
FIG. 4 is a speed diagram of an exemplary gear train according to the present invention in the second forward speed.

As shown in FIG. 4, the first planetary gear set PG1 is fixed, input is performed through the fifth rotational member N5, and an increased speed of the sixth rotational member N6 is transmitted to the seventh rotational member N7.

The fourth planetary gear set PG4 rotates as a whole by an operation of the second clutch C2 and an increased speed transmitted to the tenth operational element N10.

The twelfth rotational member N12 is operated as a fixed element, and a second forward speed line SP2 connecting the tenth rotational member N10 and the twelfth rotational member N12 is formed. Thus, the final output speed of the gear train becomes a height D2 of the second forward speed line SP2 at the position of the eleventh operational element N11, and thus the second forward speed is realized. Herein, a speed ratio of about 3.3133 is realized.

Third Forward Speed

In the third forward speed, the second brake B2, which is operated in the second forward speed, is released, and the third clutch C3 is operated as shown in FIG. 2.

Figure 5:
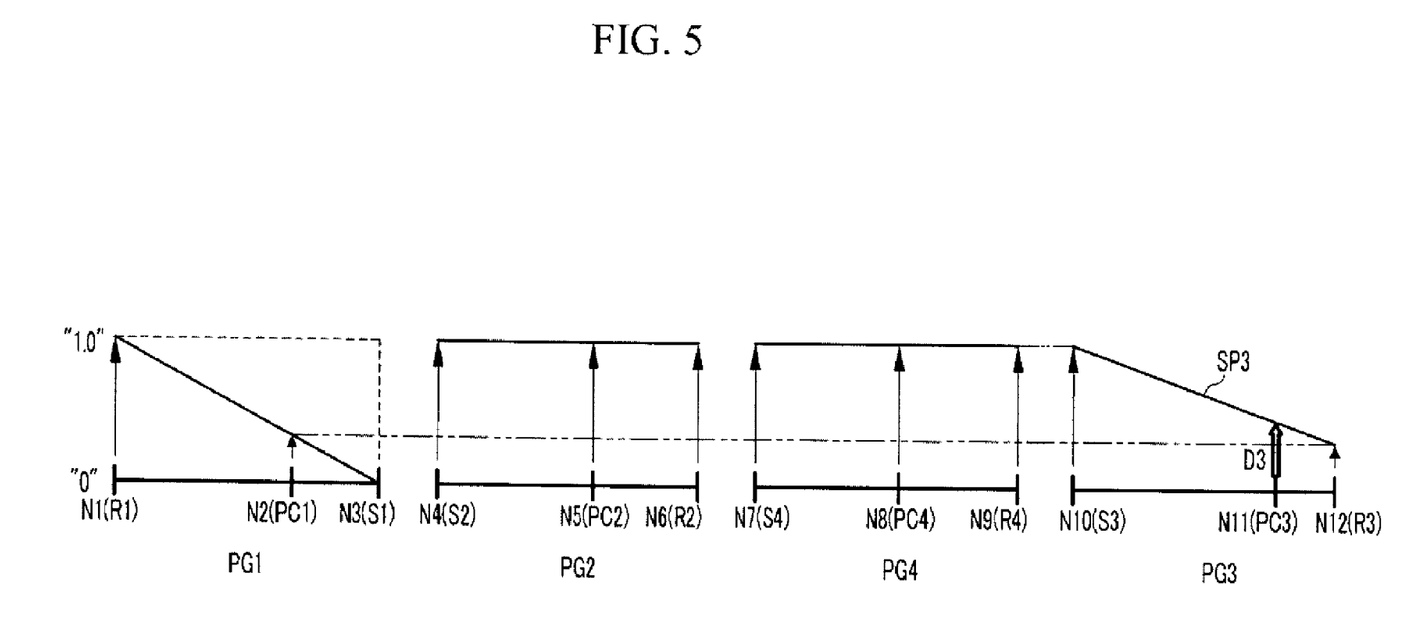
FIG. 5 is a speed diagram of an exemplary gear train according to the present invention in the third forward speed.

As shown in FIG. 5, an input speed of the fifth rotational member N5 is transmitted to the ninth rotational member N9 and the tenth rotational member N10 by an operation of the third clutch C3.

The fourth planetary gear set PG4 rotates as a whole by an operation of the second clutch C2, and the fifth rotational member N5 and the sixth rotational member N6 are connected with the ninth rotational member N9 and the seventh rotational member N7 respectively so that the second planetary gear set PG2 rotates as a whole as well.

A rotational speed of the fourth rotational member N4 is transmitted to the first rotational member N1 and the third operational element N3 is operated as a fixed element by an operation of the first brake B1, and thus the second rotational member N2 outputs a reduced speed.

The reduced speed of the second rotational member N2 is transmitted to the twelfth rotational member N12, and the rotational speed of the input shaft IS is transmitted to the tenth rotational member N10.

Thus, a third forward speed line SP3 connecting the tenth rotational member N10 and the twelfth rotational member N12 is formed. The final output speed of the gear train becomes a height D3 of the third forward speed line SP3 at the position of the eleventh operational element N11, and thus the third forward speed is realized. Herein, a speed ratio of about 1.600 is realized.

Fourth Forward Speed

In the fourth forward speed, the third clutch C3, which is operated in the third forward speed, is released, and the first clutch C1 is operated as shown in FIG. 2.

Figure 6:
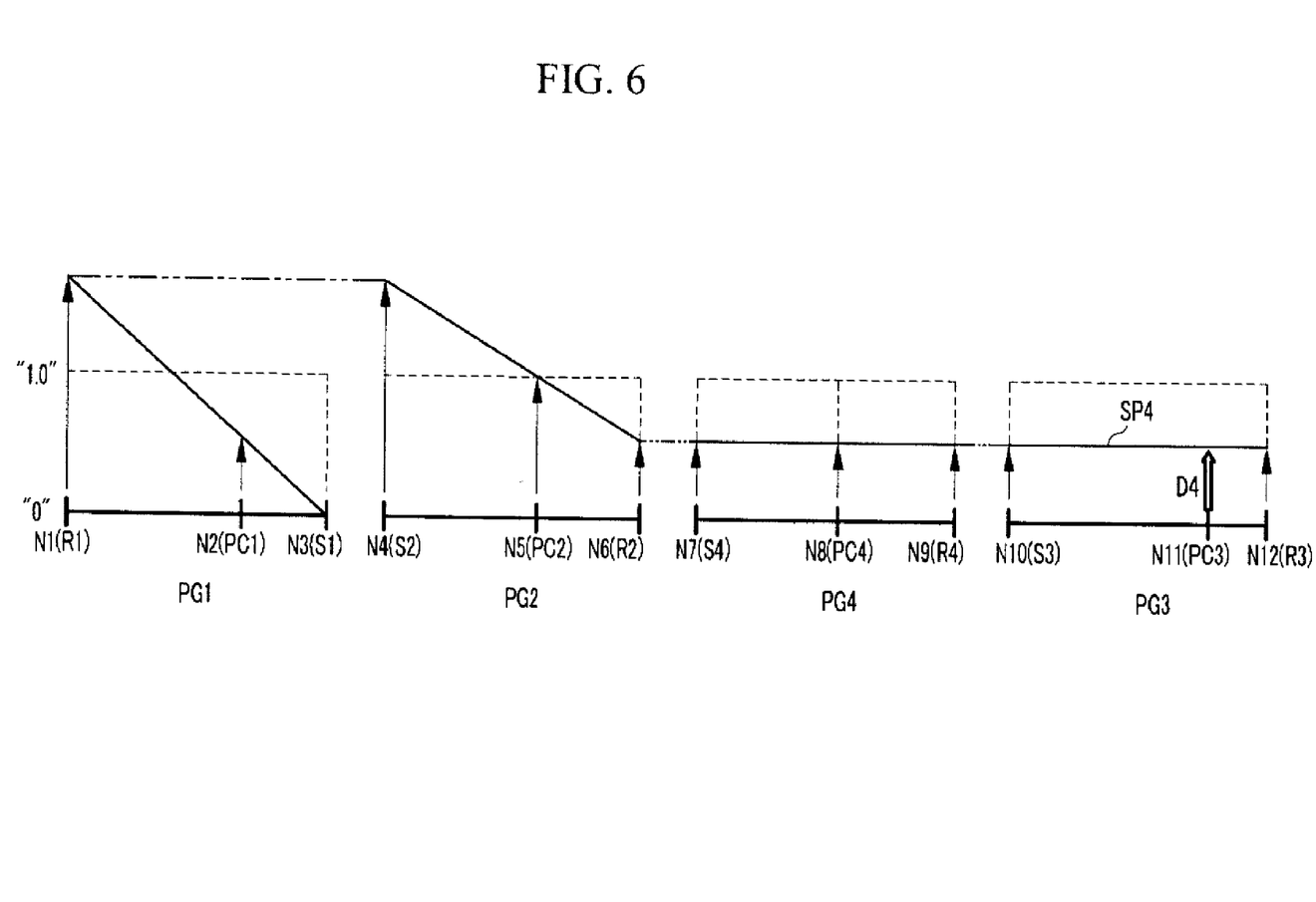
FIG. 6 is a speed diagram of an exemplary gear train according to the present invention in the fourth forward speed.

As shown in FIG. 6, the fourth planetary gear set PG4 rotates as a whole by an operation of the second clutch C2, and the eighth rotational member N8 and the ninth rotational member N9 are connected with the eleventh rotational member N11 and the tenth rotational member N10 respectively so that the third planetary gear set PG3 rotates as a whole as well.

Input is performed through the fifth rotational member N5, and the third rotational member N3 is operated as a fixed element by an operation of the first brake B1. The fourth rotational member N4 and the first rotational member N1 output an increased speed and the second rotational member N2 outputs a reduced speed due to a complementary operation.

A rotational speed of the second rotational member N2 is transmitted to the twelfth rotational member N12 of the third planetary gear set PG3 and a fourth forward speed line SP4 is formed. Thus, the final output speed of the gear train becomes a height D4 of the fourth forward speed line SP4 at the position of the eleventh operational element N11, and thus the fourth forward speed is realized. Herein, a speed ratio of about 1.303 is realized.

Fifth Forward Speed

In the fifth forward speed, the second clutch C2, which is operated in the fourth forward speed, is released, and the third clutch C3 is operated as shown in FIG. 2.

Figure 7:
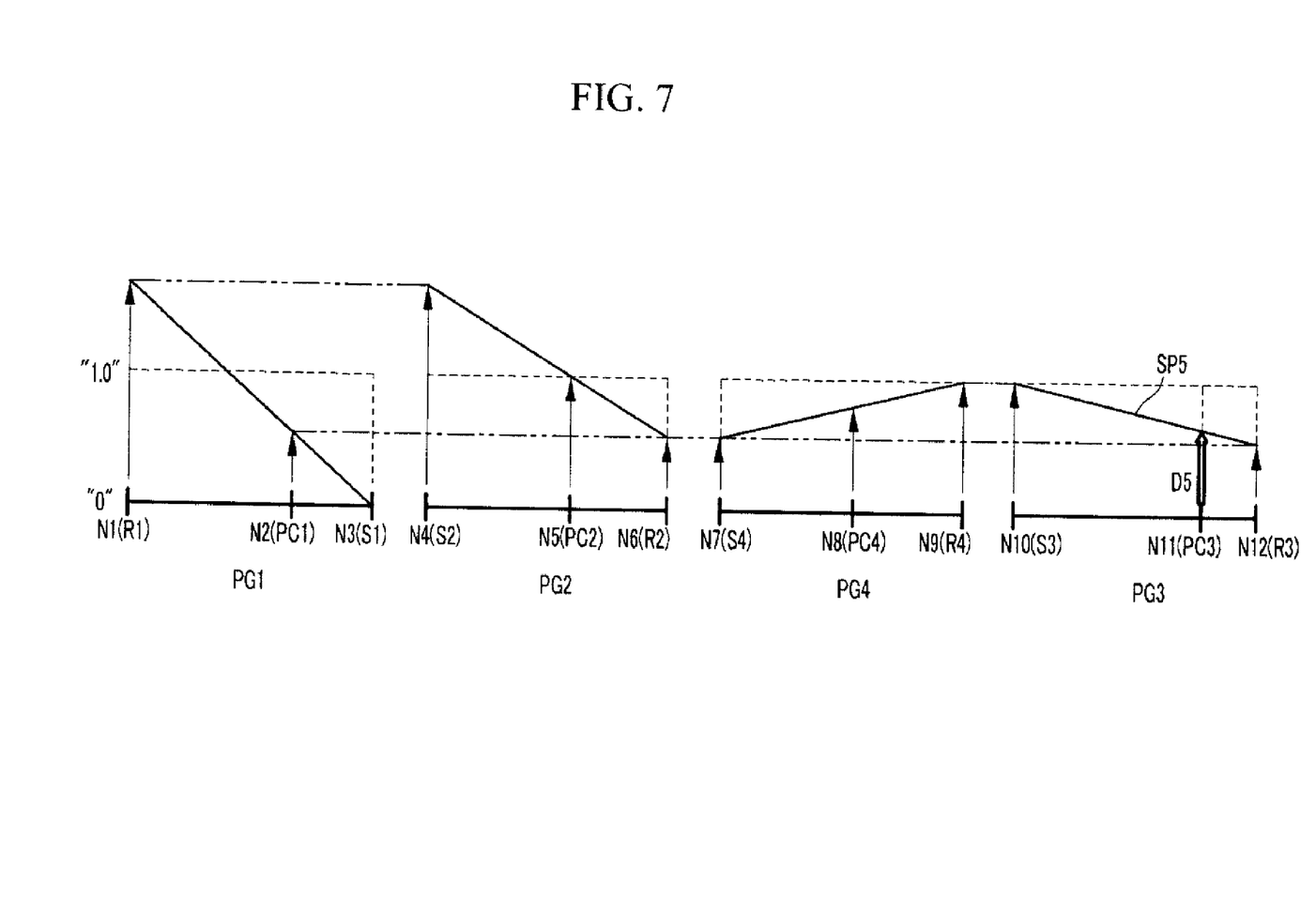
FIG. 7 is a speed diagram of an exemplary gear train according to the present invention in the fifth forward speed.

As shown in FIG. 7, the fifth rotational member N5 receives an input speed and the third rotational member N3 is operated as a fixed element by an operation of the first brake B1. The fourth rotational member N4 and the first rotational member N1 output an increased speed and the second rotational member N2 outputs a decreased speed due to a complementary operation.

The rotational speed of the fifth rotational member N5 is transmitted to the ninth rotational member N9 and the tenth rotational member N10 by an operation of the third clutch C3, and a reduced speed of the second rotational member N2 is transmitted to the twelfth rotational member N12.

Thus, the fifth forward speed line SP5 connecting the tenth rotational member N10 and the twelfth rotational member N12 is formed. The final output speed of the gear train becomes a height D5 of the fifth forward speed line SP5 at the position of the eleventh operational element N11, and thus the fifth forward speed is realized. Herein, a speed ratio of about 1.135 is realized.

Sixth Forward Speed

In the sixth forward speed, the first brake B1, which is operated in the fifth forward speed, is released, and the second clutch C2 is operated as shown in FIG. 2.

Figure 8:
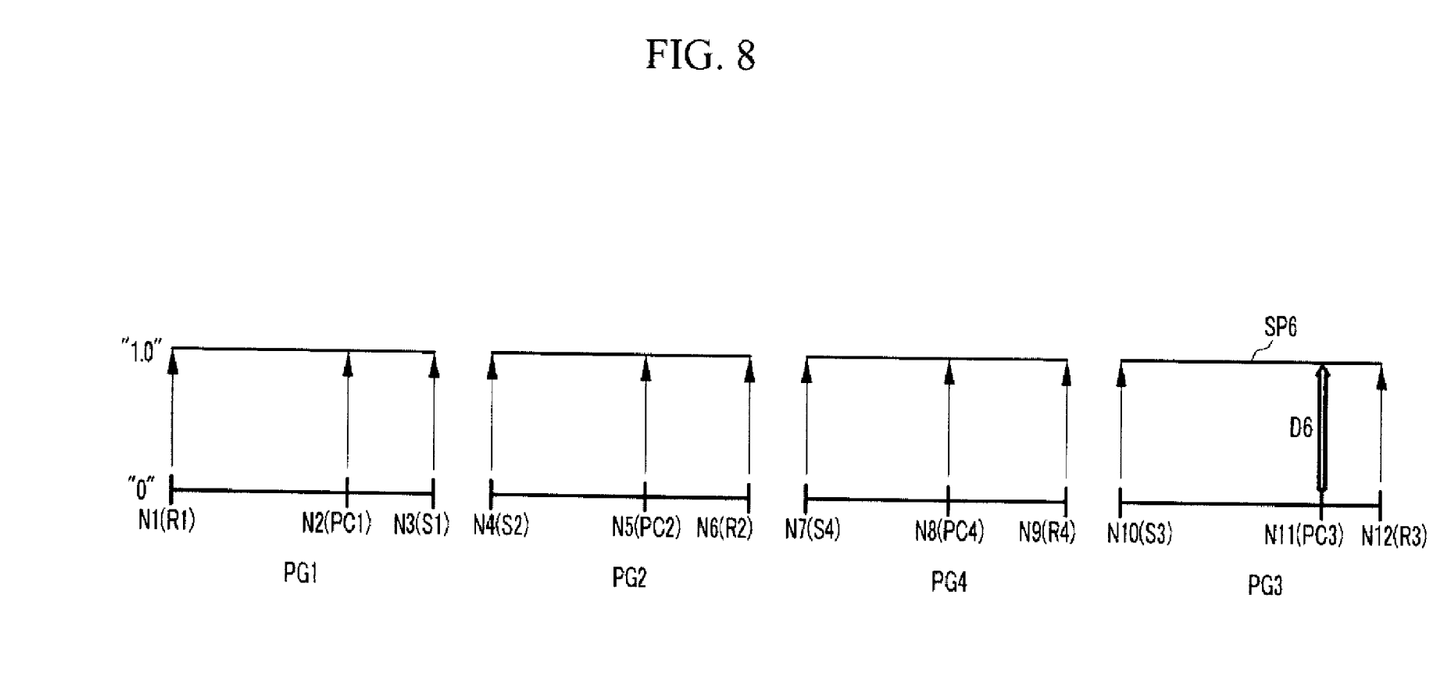
FIG. 8 is a speed diagram of an exemplary gear train according to the present invention in the sixth forward speed.

As shown in FIG. 8, three clutches C1, C2, and C3 are operated so that the first, second, third, and fourth planetary gear sets PG1, PG2, PG3, and PG4 respectively rotate as a whole.

Thus, the third planetary gear set PG3 forms the sixth forward speed line SP6 and the final output speed of the gear train becomes a height D6 of the fifth forward speed line SP6 at the position of the eleventh operational element N11, and thus the sixth forward speed is realized. Herein, a speed ratio of 1.000 is realized.

Seventh Forward Speed

In the seventh forward speed, the second clutch C2, which is operated in the sixth forward speed, is released, and the second brake B2 is operated as shown in FIG. 2.

Figure 9:
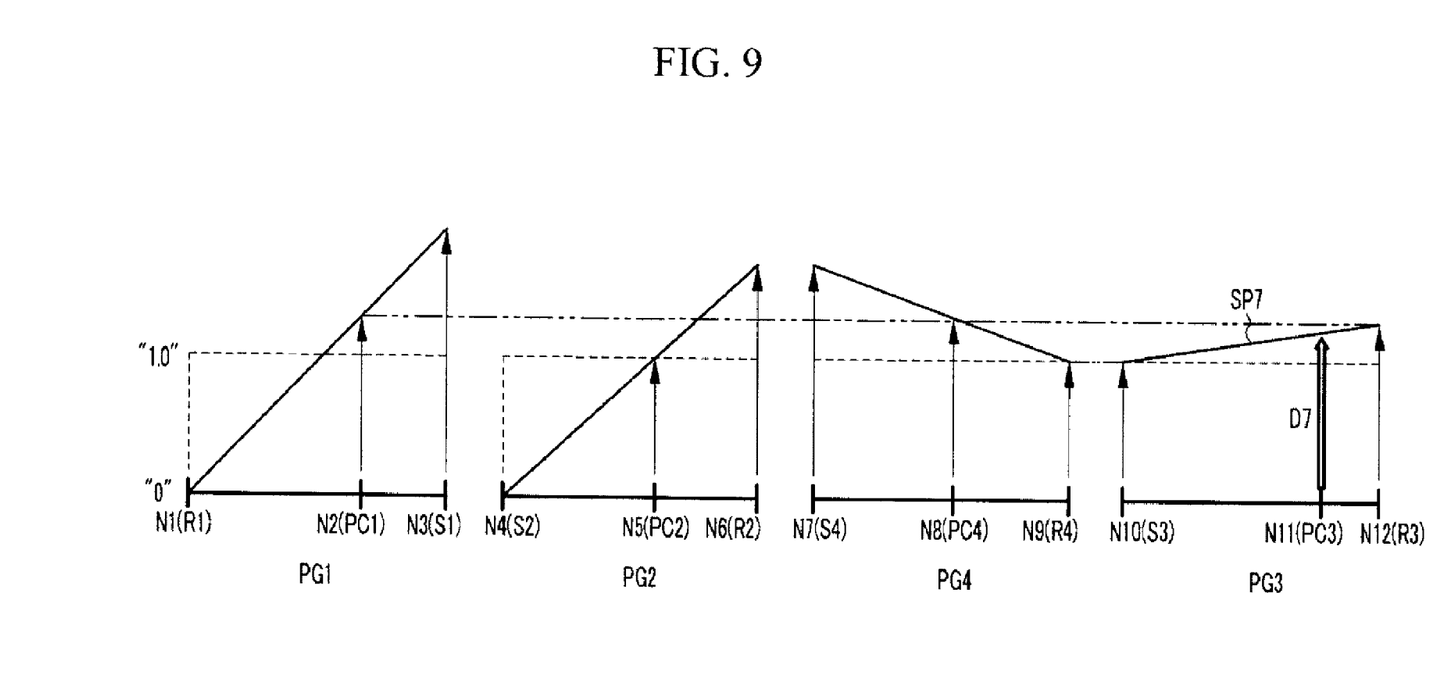
FIG. 9 is a speed diagram of an exemplary gear train according to the present invention in the seventh forward speed.

As shown in FIG. 9, the first rotational member N1 and the fourth rotational member N4 are operated as a fixed element by an operation of the second brake B2, and input is performed through the fifth rotational member N5. The second rotational member N2 outputs an increased speed due to a complementary operation and the increased speed is transmitted to the twelfth rotational member N12.

A rotational speed of the input shaft IS is transmitted to the tenth rotational member N10 by an operation of the third clutch C3, and the seventh forward speed line SP7 connecting the tenth rotational member N10 and the twelfth rotational member N12 is formed. Thus, the final output speed of the gear train becomes a height D7 of the seventh forward speed line SP7 at the position of the eleventh operational element N11, and thus the seventh forward speed is realized. Herein, a speed ratio of about 0.839 is realized.

Eighth Forward Speed

In the eighth forward speed, the third clutch C3, which is operated in the seventh forward speed, is released, and the second clutch C2 is operated as shown in FIG. 2.

Figure 10:
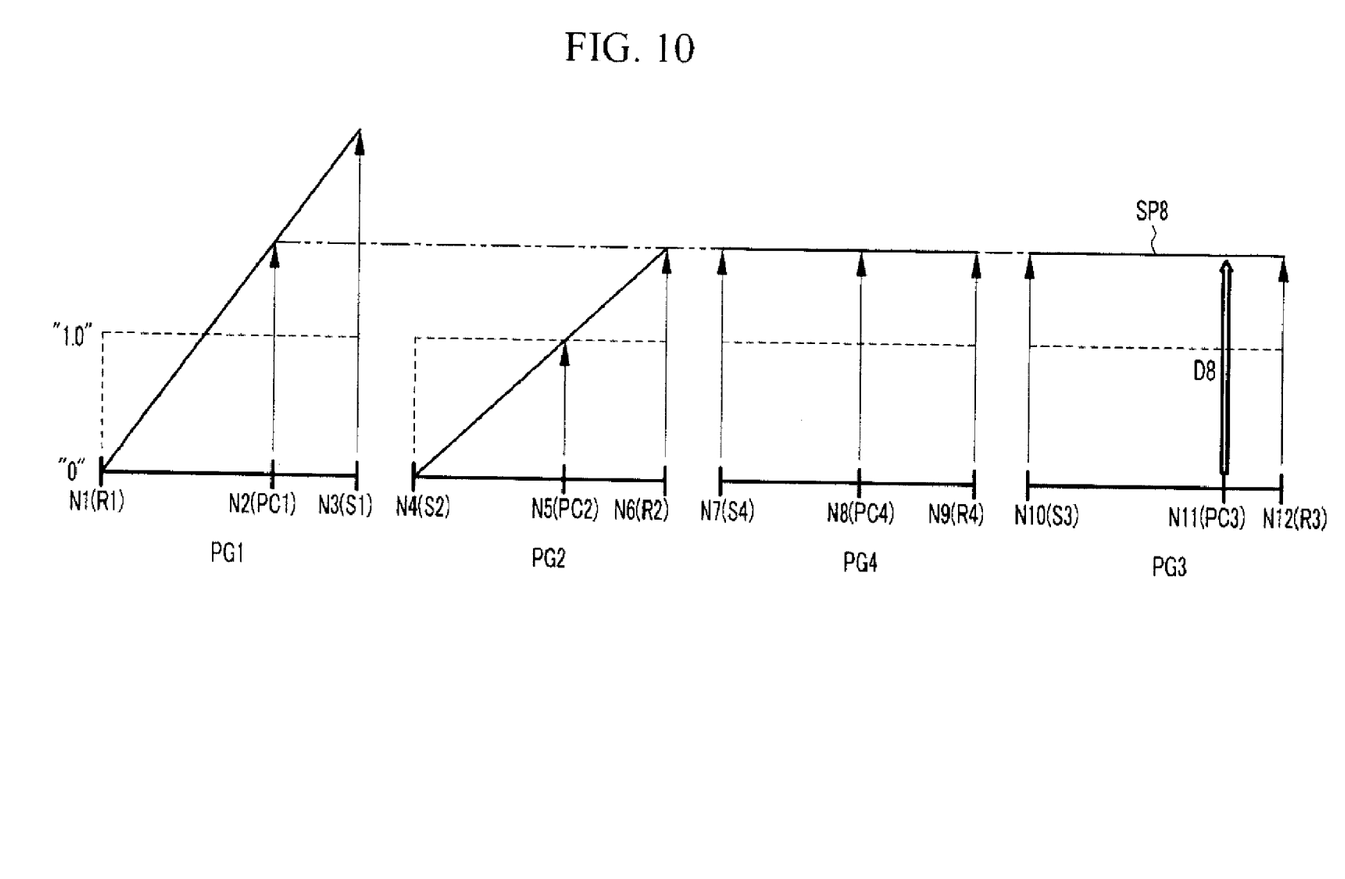
FIG. 10 is a speed diagram of an exemplary gear train according to the present invention in the eighth forward speed.

As shown in FIG. 10, the fourth planetary gear set PG4 rotates as a whole by an operation of the second clutch C2. And the eighth rotational member NS and the ninth rotational member N9 are connected with the eleventh rotational member N11 and the tenth rotational member N10, respectively, so that the third planetary gear set PG3 rotates as a whole as well.

Input is performed through the fifth rotational member N5 and the first rotational member N1 and the fourth rotational member N4 are operated as a fixed element by an operation of the second brake B2. The second rotational member N2 outputs an increased speed due to a complementary operation and the increased speed is transmitted to the twelfth rotational member N12.

The eighth forward speed line SP8 is formed and the final output speed of the gear train becomes a height D8 of the eighth forward speed line SP8 at the position of the eleventh operational element N11, and thus the eighth forward speed is realized. Herein, a speed ratio of 0.667 is realized.

Reverse Speed

In reverse speed, as shown in FIG. 2, the first clutch C1 and the first and second brakes B1 and B2 are operated.

Figure 11:
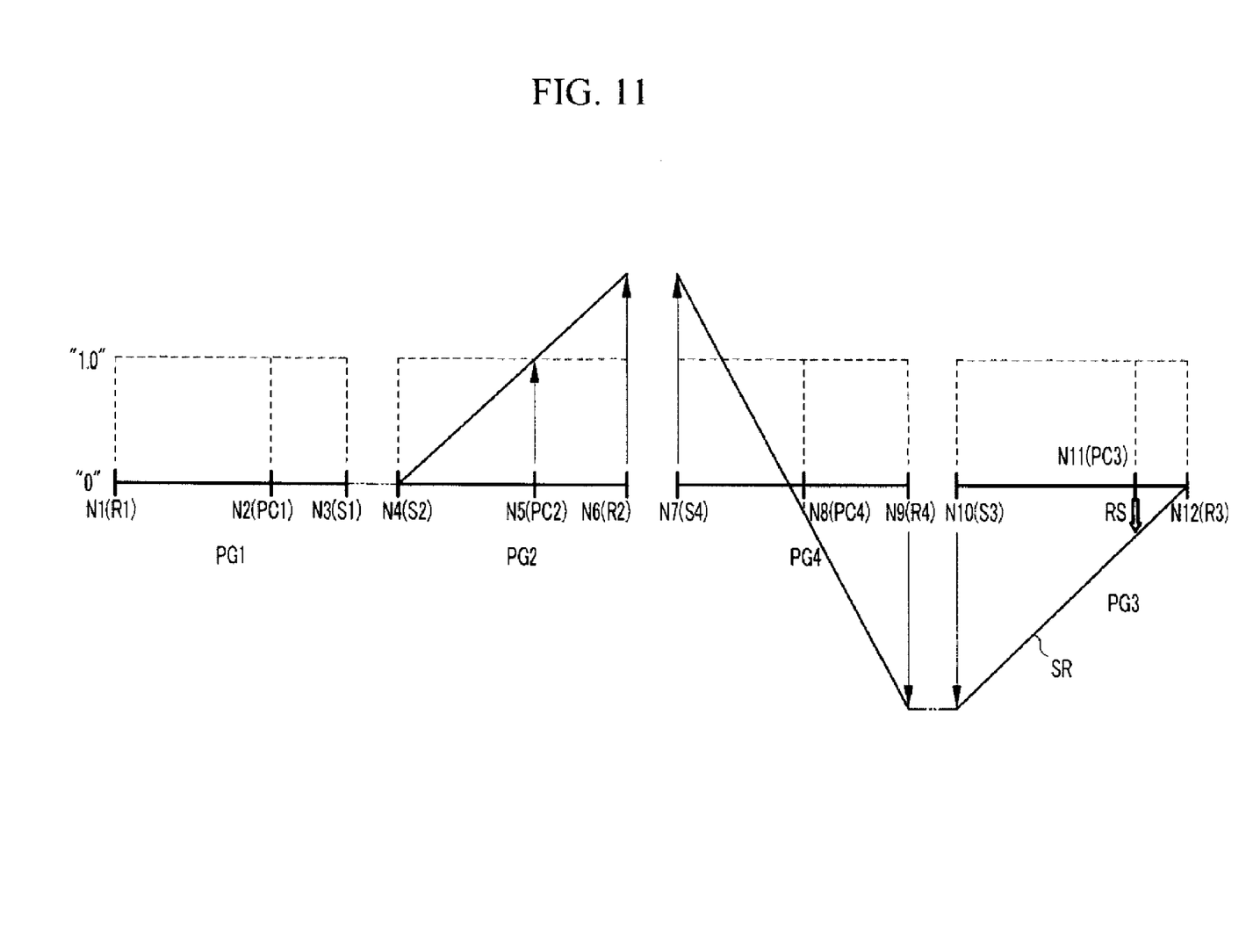
FIG. 11 is a speed diagram of an exemplary gear train according to the present invention in the reverse speed.

As shown in FIG. 11, input is performed through the fifth rotational member N5 and the first planetary gear set PG1 is fixed by operations of the first and second brakes B1 and B2. Thus, the fourth rotational member N4, which is connected with the first rotational member N1, is fixed.

The sixth rotational member N6 outputs an increased speed and the increased speed is transmitted to the seventh rotational member N7. The twelfth rotational member N12 is operated as a fixed element according to fixing of the first planetary gear set PG1, and the ninth rotational member N9 and the tenth rotational member N10 output a reverse speed due to a complementary operation.

A reverse speed line SR is formed and the final output speed of the gear train becomes a height SR of the reverse speed line SR at the position of the eleventh operational element N11, and thus the reverse speed is realized. Herein, a speed ratio of about −3.280 is realized.

The gear train of an automatic transmission for a vehicle according to various aspects of the present invention is composed of four planetary gear sets with three clutches and two brakes, and realizes eight forward speeds so that transmitting power efficiency and fuel efficiency are enhanced.

Also, the number of friction elements can be minimized so that hydraulic lines may be easily constructed.

For convenience in explanation and accurate definition in the appended claims, the terms "upper" or "lower", "front", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof.

It is intended that the scope of the invention be defined by the Claims appended hereto and their equivalents.

What is claimed is:

1. A gear train of an automatic transmission for a vehicle, comprising:
   a first planetary gear set including a first sun gear, a first planet carrier, and a first ring gear;
   a second planetary gear set including a second sun gear, a second planet carrier, and a second ring gear;
   a third planetary gear set including a third sun gear, a third planet carrier, and a third ring gear;
   a fourth planetary gear set including a fourth sun gear, a fourth planet carrier, and a fourth ring gear; and
   first, second, and third clutches and first and second brakes, wherein
   an input shaft is directly connected with the second planet carrier;
   the second sun gear is directly connected with the first ring gear;
   the first planet carrier is directly connected with the third ring gear;
   the second ring gear is directly connected with the fourth sun gear;
   the third sun gear is directly connected with the fourth ring gear;
   the third planet carrier is variably connected with the fourth planet carrier;
   the fourth sun gear is variably connected with the fourth planet carrier;
   the second planet carrier is variably connected with the third sun gear;
   the first sun gear and the first ring gear are variably connected with a transmission housing, respectively; and
   the third planet carrier is connected with an output gear.

2. The gear train of an automatic transmission for a vehicle of claim 1, wherein:
   the input shaft and the second planet carrier are connected by a first power transmitting member;
   the second sun gear and the first ring gear are connected by a second power transmitting member;
   the first planet carrier and the third ring gear are connected by a third power transmitting member;
   the second ring gear and the fourth sun gear are connected by a fourth power transmitting member;
   the third sun gear and the fourth ring gear are connected by a fifth power transmitting member;
   the third planet carrier and the fourth planet carrier are variably connected by a first variable power transmitting member including the first clutch;
   the fourth sun gear and the fourth planet carrier are variably connected by a second variable power transmitting member including the second clutch;
   the second planet carrier and the third sun gear are variably connected by a third variable power transmitting member including the third clutch;
   the first sun gear is variably connected with the transmission housing via the first brake; and
   the first ring gear is variably connected with the transmission housing via the second brake.

3. The gear train of an automatic transmission for a vehicle of claim 1, wherein the first planetary gear set is a double pinion planetary gear set, and the second, third, and fourth planetary gear sets are single pinion planetary gear sets.

4. The gear train of an automatic transmission for a vehicle of claim 1, wherein the first, second, third, and fourth planetary gear sets are disposed on the same shaft axis line, and are disposed in a sequence of the first, second, third, and fourth planetary gear sets.

5. The gear train of an automatic transmission for a vehicle of claim 1, wherein:
   the first and second brakes are disposed in front of the first planetary gear set;
   the third clutch is disposed between the second and third planetary gear sets; and
   the first and second clutches are disposed behind the fourth planetary gear set.

6. A gear train of an automatic transmission for a vehicle, comprising:
   a first planetary gear set including a first sun gear, a first planet carrier, and a first ring gear;
   a second planetary gear set including a second sun gear, a second planet carrier, and a second ring gear;
   a third planetary gear set including a third sun gear, a third planet carrier, and a third ring gear;
   a fourth planetary gear set including a fourth sun gear, a fourth planet carrier, and a fourth ring gear; and
   first, second, and third clutches and first and second brakes, wherein
   an input shaft is directly connected with the second planet carrier via a first power transmitting member;
   the second sun gear is directly connected with the first ring gear via a second power transmitting member;
   the first planet carrier is directly connected with the third ring gear via a the third power transmitting member;
   the second ring gear is directly connected with the fourth sun gear via a fourth power transmitting member;
   the third sun gear is directly connected with the fourth ring gear via a fifth power transmitting member;
   the third planet carrier is variably connected with the fourth planet carrier via a first variable power transmitting member including the first clutch;
   the fourth sun gear is variably connected with the fourth planet carrier via a second variable power transmitting member including the second clutch;
   the second planet carrier is variably connected with the third sun gear via a third variable power transmitting member including the third clutch;
   the first sun gear is variably connected with a transmission housing via the first brake;
   the first ring gear is variably connected with a transmission housing via the second brake; and
   the third planet carrier is connected with an output gear.

* * * * *